United States Patent
Balijapalli et al.

(10) Patent No.: US 8,995,312 B2
(45) Date of Patent: Mar. 31, 2015

(54) MULTI-CHANNEL BROADBAND RE-CONFIGURABLE RF FRONT END FOR SOFTWARE DEFINED RADIO / COGNITIVE RADIO

(71) Applicants: Kameswara Rao Balijapalli, Chennai (IN); Ravi Kishore, Chennai (IN); Kumaralingam Ramamoorthy, Chennai (IN)

(72) Inventors: Kameswara Rao Balijapalli, Chennai (IN); Ravi Kishore, Chennai (IN); Kumaralingam Ramamoorthy, Chennai (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 22 days.

(21) Appl. No.: 13/723,229

(22) Filed: Dec. 21, 2012

(65) Prior Publication Data
US 2014/0177484 A1 Jun. 26, 2014

(51) Int. Cl.
H04B 1/00 (2006.01)
(52) U.S. Cl.
CPC ................................. H04B 1/001 (2013.01)

USPC ........................................................ 370/280
(58) Field of Classification Search
USPC ........ 375/219, 299, 300, 316; 455/73, 91, 92, 455/102, 103, 115.1, 118, 127.1, 127.2, 455/127.3
See application file for complete search history.

(56) References Cited

U.S. PATENT DOCUMENTS

| | | | |
|---|---|---|---|
| 2005/0151697 A1* | 7/2005 | Cohen | 343/793 |
| 2005/0282517 A1* | 12/2005 | Cowley | 455/340 |
| 2006/0063483 A1* | 3/2006 | Suematsu et al. | 455/3.02 |
| 2007/0054682 A1* | 3/2007 | Fanning et al. | 455/509 |
| 2009/0047916 A1* | 2/2009 | Haykin | 455/115.1 |
| 2011/0053637 A1* | 3/2011 | Filipovic et al. | 455/552.1 |
| 2014/0177484 A1* | 6/2014 | Balijapalli et al. | 370/280 |

* cited by examiner

*Primary Examiner* — Benjamin H Elliott, IV

(57) ABSTRACT

Multi-channel broadband re-configurable RF Front End for Software Defined Radio/Cognitive Radio. The RF front end helps improve spectrum sensing for better spectrum utilization. The RF front end comprising of multiple channels of reconfigurable transmitters and receivers, Tx/Rx switch, reference section, control section and power section is described. The RF front-end transceiver comprises of multiple channels and adapts its parameters based on the radio environment. The RF front end works on wide bandwidth and reconfigures its parameters.

20 Claims, 6 Drawing Sheets

MULTI-CHANNEL BROADBAND RE-CONFIGURABLE RF FRONT END FOR SOFTWARE DEFINED RADIO / COGNITIVE RADIO

The present application is based on, and claims priority from, IN Application Number 3076/CHE/2012, filed on 27 Jul. 2012, the disclosure of which is hereby incorporated by reference herein.

TECHNICAL FIELD

This embodiment relates to radio frequency front-end design more particularly to a Multi-channel broadband re-configurable RF Front End for Software Defined Radio and Cognitive Radio.

BACKGROUND

Studies conducted by regulatory bodies in various countries have revealed that most of the radio frequency spectrum is inefficiently utilized. Allocation of fixed spectrum (assigned to specific services) prevents rarely used frequencies from being used by unlicensed users, even when there is no threat of interference at all with any of the assigned services.

Advances in the wireless technology along with the development of analog and digital electronics have led to the emergence of wide range of wireless and radio access technologies. There is a huge demand for the availability of spectrum with the increased number of applications in the wireless communications space. With the existing radio frequency spectrum, being pushed to its boundaries there is a limitation on the spectrum availability.

To address spectrum scarcity issue and to satisfy the increased demand of applications new methods are needed for efficient and intelligent use of spectrum.

Wireless communication systems like cognitive radios are working towards allowing the wide frequency spectrum to be shared thus enabling efficient radio spectrum utilization. Cognitive radio devices use dynamic spectrum management system and can identify available/idle frequencies/frequency bands the spectrum that can be used for communications. Multiple cognitive radio systems generally share information to find vacant spectrum bands.

For cognitive radios to succeed, it is essential that they must be software defined, capable of operating on a broader frequency range, have better interference management, strong spectrum sensing and also have re-configurability in terms of operating parameters like frequency, input/output power, receiver sensitivity, bandwidth and so on based on the radio environment. Broad frequency range of operation (for spectrum sensing, interference management and communication) and reconfigurabilty of operating parameters depends on the design of the RF front end.

SUMMARY

Accordingly, the embodiment provides a multichannel broadband re-configurable RF front-end system for software-defined radios/cognitive radios with multiple channels operating on broad frequency range. Each transceiver channel is capable of performing transmitter function and/or receiver function. Each channel contains an RF transmitter, a RF receiver, a control and monitoring section, and a reference switching section, a Transmit/Receiver switch and a power supply and conditioning circuit. The RF transmitter up converts baseband signal to a RF signal. The RF receiver converts the received RF signal from antenna in to the baseband signal using double/dual conversion. One receiver of one transceiver channel is dedicated for sensing of spectrum holes if used for cognitive radio application. Each transceiver channel is reconfigurable across a range of operating parameters. The parameters are reconfigured using a control and monitoring section, which has controller for sending and receiving reconfiguration information. The reference switching section provides said reference frequency-to-frequency synthesizers in channel. A Transmit/Receiver switch is used to operate/perform a channel in TDD or FDD mode of operation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
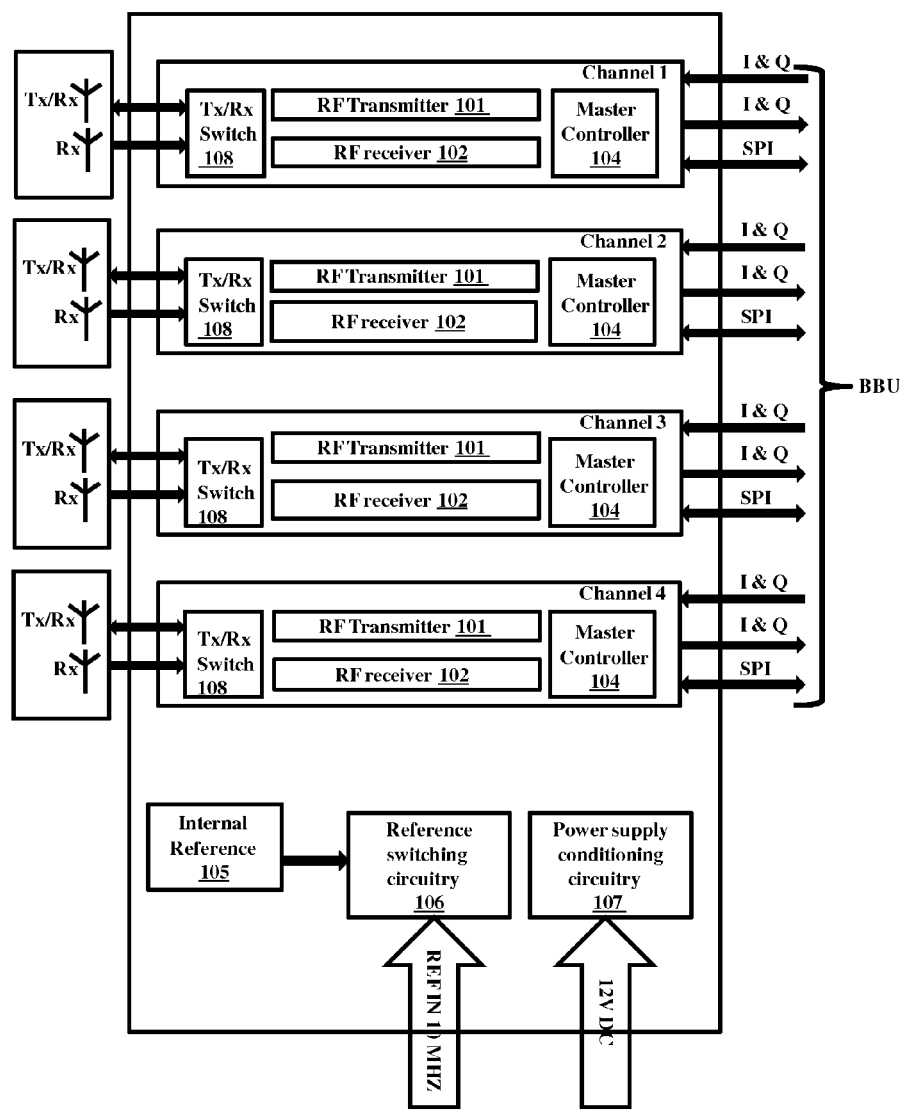
FIG. 1 illustrates a block diagram of multichannel broadband reconfigurable RF front end, according to the embodiments as disclosed herein.

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 6, where similar reference characters denote corresponding features consistently throughout the figures, there are shown preferred embodiments.

FIG. 1 illustrates a block diagram of multichannel broadband reconfigurable RF front end, according to the embodiments as disclosed herein. The Multi Channel Broadband Reconfigurable RF Front End consists of the multiple channels and consists of RF receivers (down converters) 102, RF Transmitters (Up converters) 101, control and Monitoring Section (Controller) 104, Optional Internal Reference (105), reference switching section 106, Tx/Rx switches 108 and power supply/power supply and conditioning circuitry 107.

Each channel can operate from 400 MHz to 6000 MHz. Each channel comprises of RF-transmitter 101/up converter, RF receiver 102/down converter, master controller 104 and its associated circuitry. Each channel will get a common reference from reference and switching circuitry 106. The reference could be internally generated through internal reference 105 or can be externally supplied. Each broadband RF transceiver channel is connected to broadband antennas through TX/RX switch 108. Depending on the position of the TX/RX switch 108, the channel works at the TDD (Time Division Duplex) mode or FDD (Frequency Division Duplex) mode. The selection of the operating mode is controlled from the baseband unit. The individual blocks of the system are powered by power supply and conditioning circuitry 107. In the multichannel RF front end, one receiver in one channel works as a "sensing channel" for sensing the environment and other channels are used for the communication at broad frequency range. Although in FIG. 1 only depicted four channels and associated control section is depicted in practice it but can be applied to multiple channels (more than 4). The RF receiver 102 and RF transmitter 101 contains appropriate modulators, demodulators, local oscillators and so on for operation.

Figure 2:
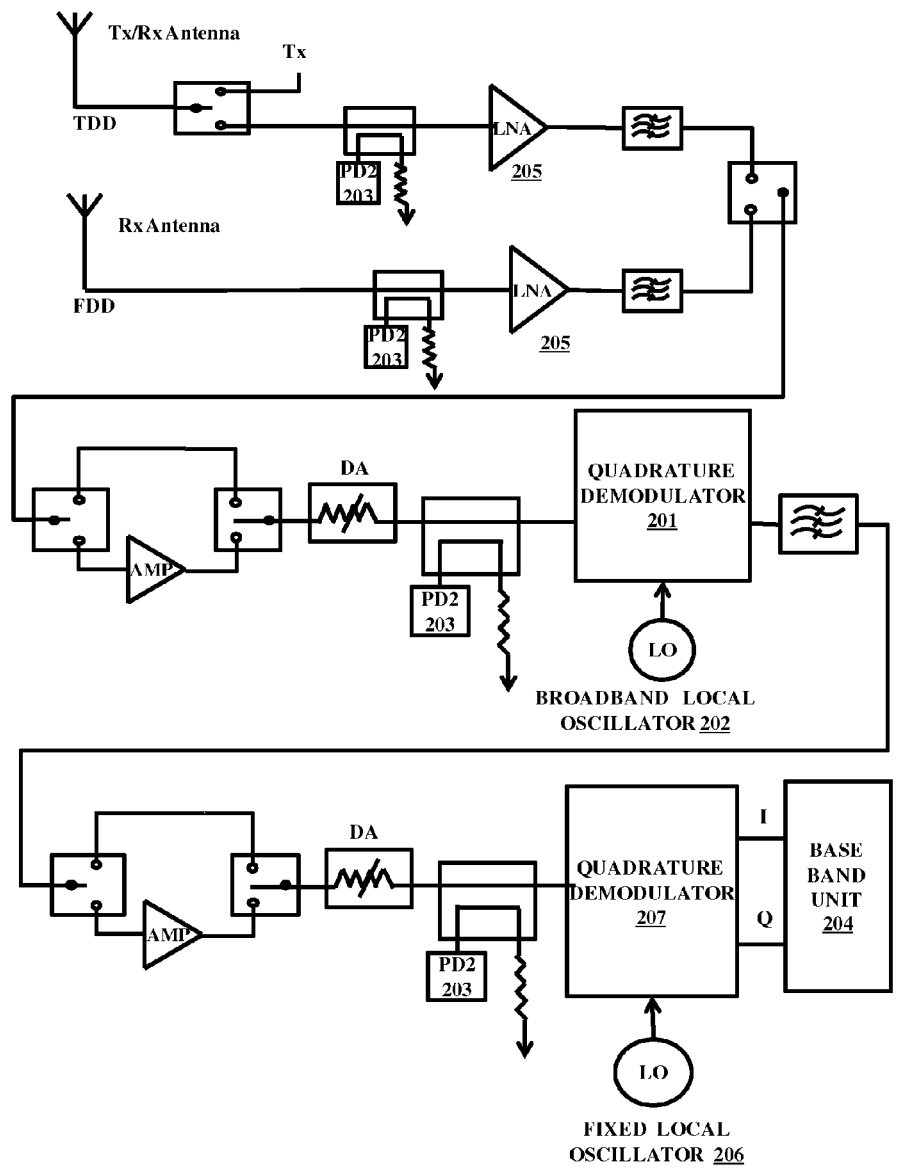
FIG. 2 is a block diagram of receiver section in a multichannel broadband reconfigurable RF front end, according to the embodiments disclosed herein.

FIG. 2 is a block diagram of receiver section in a multichannel broadband reconfigurable RF front end, according to the embodiments disclosed herein. The broadband, reconfigurable RF receiver comprises of two quadrature demodulators 201, broadband local oscillator circuitry 202, fixed frequency local oscillator circuitry 206, low noise amplifiers 205, RF variable attenuators, RF Power detection circuitry 203, and control and monitoring circuitry (not shown in figure). The received signal from antenna is fed to the broadband re-configurable RF receiver. The receiver can work at the TDD (Time Division Duplex) mode or FDD (Frequency Division Duplex) mode using the switch as shown in FIG. 2. The broadband re-configurable RF receiver provides the appropriate amplification to the input signal; using the low noise amplifier 205, gain blocks and digital attenuators. Amplified input signal is down converted into baseband signal using dual conversion. During reception, to avoid the desensitization of receiver, received RF signal in the range 400 MHz to 6000 MHz is first down converted into 70 MHz I/Q signal. The local oscillator frequency is generated by the synthesizer circuitry. Two different synthesizers are used in the receiver. Two LO signals are sent to the two different demodulators. At first conversion, the quadrature demodulator 201 converts the input RF frequency signal into First IF (say 70 MHz signal). At second conversion, the first IF is further down converted into zero IF or low IF signal (say 0 MHz to 22 MHz) using another quadrature demodulator 207. Local oscillator signals for the first quadrature demodulator 201 (First LO) are generated using broadband LO circuitry 202. The local oscillator signal for the second quadrature modulator 207 (Second LO) is constant/fixed frequency and generated by fixed frequency LO circuitry 206. Multiple power detection circuitry are used for precise power detection and thus for precise automatic gain control (AGC). The power detection circuitry 203 comprising an ultra high bandwidth, high directivity coupler and power detector. The reference signal required for generating the local oscillator signals is provided using reference generating circuitry. The controlling and re-configuring are done by the control and monitoring circuitry. The re-configurability in terms of operating frequency is provided by changing the Local oscillator signal (from the broadband local oscillator circuitry, First LO 202) to the quadrature demodulator 201. The frequency is re-configurable or changeable in precise steps (say in the order of 100 KHz). The re-configurability in terms of input power dynamic range is provided by selecting the appropriate amplification path (out of the four (N) paths) using automatic gain control (AGC) mechanism. The receiver is re-configurable/changeable to the input power level in precise steps (say in the order of 1 dB). The receiver can operate over a broad frequency range (say from 400 MHz to 6000 MHz) and can support broad input power dynamic range (say average input power from −80 dBm to +0 dBm). The receiver is reconfigurable to any frequency within the frequency range of operation and can be configured to any input power within the input power dynamic range. The receiver section has been described in patent application 2433/CHE/2012.

Figure 3:
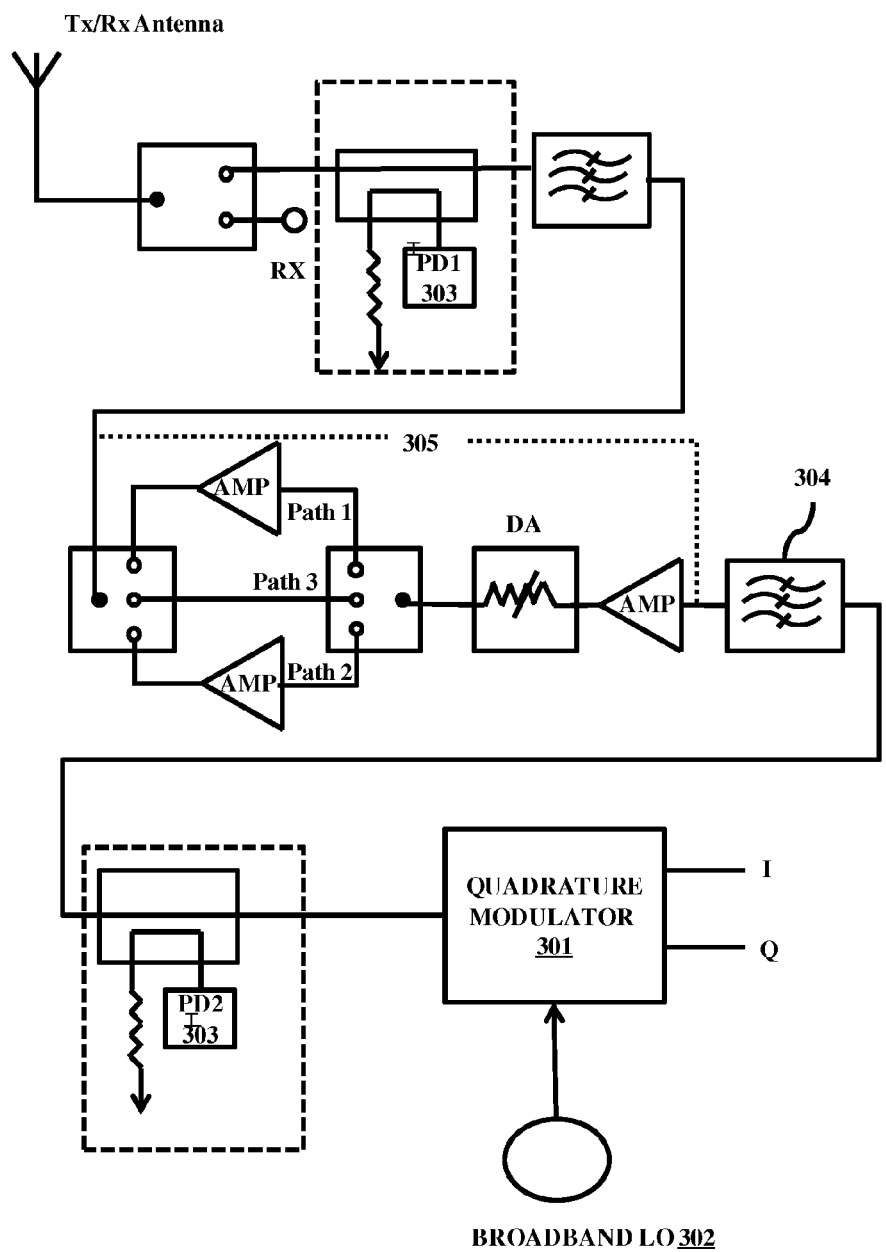
FIG. 3 is a block diagram of transmitter section in a multichannel broadband reconfigurable RF front end, according to the embodiments disclosed herein.

FIG. 3 is a block diagram of transmitter section in a multichannel broadband reconfigurable RF front end, according to the embodiments disclosed herein. The transmitter unit is implemented based on direct conversion architecture. The broadband, reconfigurable RF transmitter comprises of quadrature modulator 301, broadband local oscillator circuitry 302, RF amplifiers, RF variable attenuators, RF Power detection circuitry 303, and control and monitoring circuitry. The baseband signal with Q channels and I is fed to the wideband quadrature modulator 301. The local oscillator signal for the quadrature modulator 301 is generated using broadband Local oscillator circuitry 302. The low power RF signal generated by quadrature modulator 301 is subjected to required amplification and attenuation 305 and filtered 304 to provide the required output power. The re-configurability in terms of operating frequency is provided by changing the local oscillator signal (from the broadband local oscillator circuitry 302) to the quadrature modulator 301. The re-configurability in terms of output power is provided by selecting the appropriate amplification path (out of the three (N) paths) and appropriate DVA settings in the corresponding path. The frequency is re-configurable or changeable in precise steps (say in the order of 100 KHz). The output power is re-configurable and changeable in precise steps (say in the order of 1 dB). Multiple power detection sections are used for precise power detection and thus for precise automatic power control (APC) and Automatic Gain Control (AGC) with precise output power level. Plurality of power detection circuitry is placed into the chain. Multiple power detection circuits output signal sends to the controller, where it is matches with desired output signal power level, by which can get accurate and precise output power. The power detection circuitry 303 comprising an ultra high bandwidth, high directivity coupler and power detector. The reference signal required for generating the local oscillator signal is provided using reference generating circuitry. The controlling and re-configuring are done by the control and monitoring circuitry. The channel can also work at the TDD (Time Division Duplex) mode or FDD (Frequency Division Duplex) mode using the switch as shown in FIG. 3. The detailed description of the transmitter is provided in 2434/CHE/2012, the description of which is included herein by reference.

Figure 4:
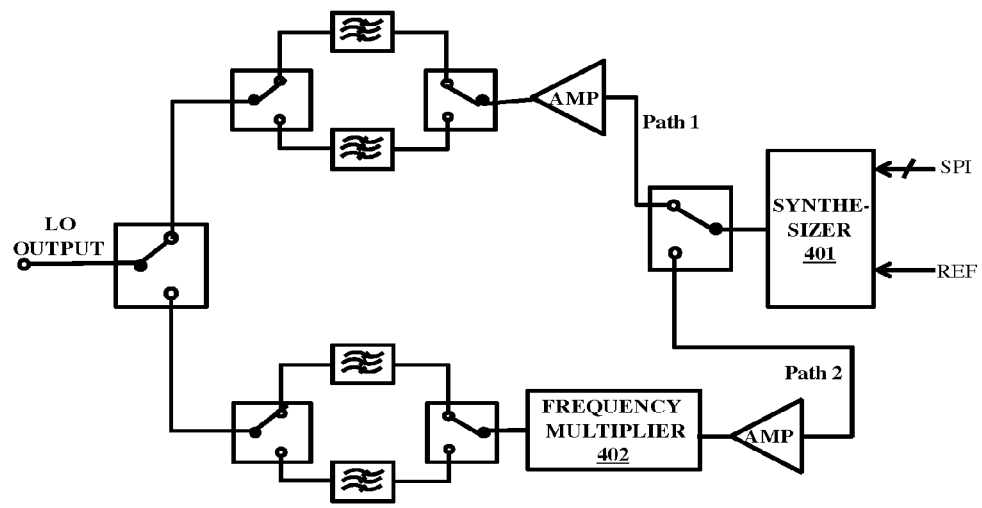
FIG. 4 is a block diagram of the local oscillator section used in a multichannel broadband reconfigurable RF front end, according to the embodiments disclosed herein.

FIG. 4 is a block diagram of the broadband local oscillator section used in a multichannel broadband reconfigurable RF front end, according to the embodiments disclosed herein. In each channel, two broadband local oscillators are used;

wherein one LO is present in the RF transmitter 101 and the second LO is present in the RF receiver 102. The receiver also comprises of a fixed frequency oscillator for down conversion of received signal. A frequency synthesizer 401 is used to produce the desired range of frequencies. Reference frequency generated by the reference generating section is for the frequency synthesizer 401. Synthesizer 401 receives commands from the control and monitoring circuitry and accordingly generates a broadband local oscillator frequency. To achieve the broadband operation, the LO section comprises two frequency selection paths. The path 1 is to generate the portion of the entire frequency range that the frequency synthesizer could support. The path 2 comprises a frequency multiplier to cover the remaining portion of the frequency range and that the frequency synthesizer could not support. Appropriate amplification and filtering is provided in both paths to achieve required LO power level and with adequate harmonic rejection. Appropriate path will be selected using RF switches, which receives the commands from control and monitoring circuitry. The detailed description of the LO is provided in 2433/CHE/2012 and 2434/CHE/2012, the description of which are included herein by reference.

Figure 5:
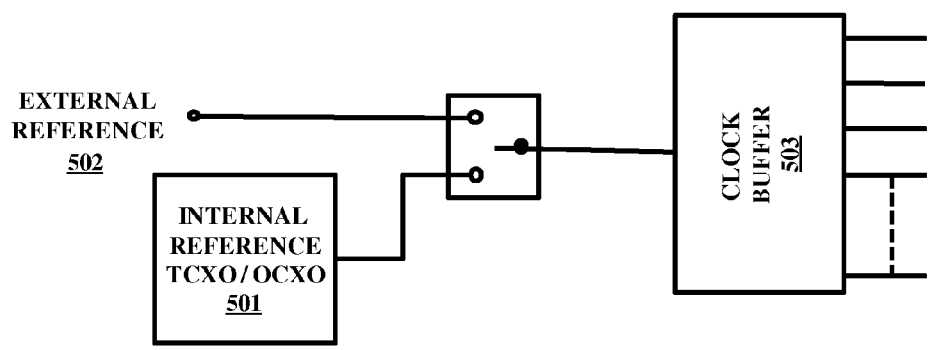
FIG. 5 is a block diagram of the reference section used in a multichannel broadband reconfigurable RF front end, according to the embodiments disclosed herein.

FIG. 5 is a block diagram of the reference section used in a multichannel broadband reconfigurable RF front end, according to the embodiments disclosed herein. The reference section produces the required reference signal for the frequency synthesizer in the RF receiver 102 and RF transmitter 101 for all the channels to produce the corresponding LO signal. The reference section produces the number of coherent signals say at 10 MHz frequency. The reference section provides the coherent reference signals using clock buffers 503 to all synthesizers in the RF front-end unit and to the other section modules (like baseband unit) for synchronization purpose. By default, the system operates with internal reference frequency 501 that is generated by the TCXO/OCXO. In the presence of the external reference frequency 502 of say 10 MHz with adequate power level internal reference will be switched off and external reference is given to all frequency synthesizers in transmitter as well as in receiver section.

Figure 6:
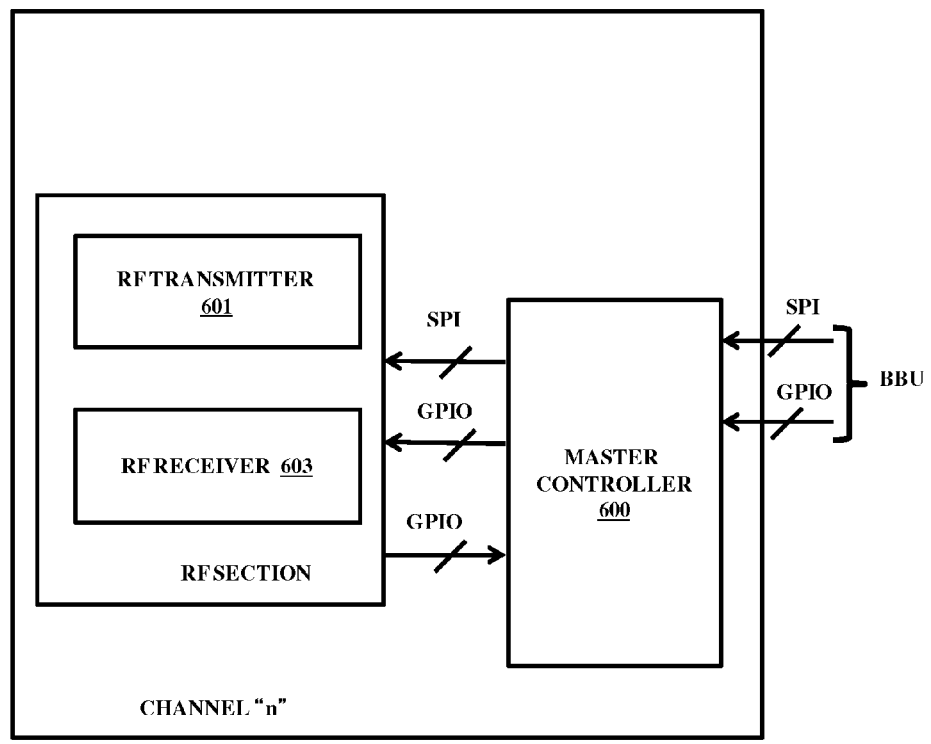
FIG. 6 is a block diagram of the control and monitoring section used in a multichannel broadband reconfigurable RF front end, according to the embodiments disclosed herein.

FIG. 6 is a block diagram of the control and monitoring section used in a multichannel broadband reconfigurable RF front end, according to the embodiments disclosed herein. The control and monitoring section reports the health status of the RF transmitter to the base band unit. The control and monitoring interface section contains a microcontroller 600 and its associated circuitry.

The baseband unit sends commands, like frequency setting, attenuation setting, to the controller section (Master controller) of the RF Frontend. The Control section processes it and modifies it suitably according to the up convertor 601 and down converters 602 and then sends it to the controllers (slave controllers) in the respective Tx and Rx. The slave controllers could have direct interface to the baseband unit also. This master controller 600 receives instruction from the baseband unit (BBU) through an interface (say SPI) for a required frequency (within the frequency range of operation) and required output power (within the output power dynamic range) for each channel.

The RF front end can suitably work in receiver mode for say −80 dBm to 0 dBm average input power and in transmit mode for say −70 dBm to +10 dBm average output power. The RF front end can suitably be used up to 12 dB crest factor signal. The multichannel broadband reconfigurable RF front end is well suited for cognitive application: with multiple channels, with broadband nature of front end, plurality of communication standards can be supported and with re-configurability of variable power levels and frequency range can be supported.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for at least one of software defined radios and cognitive radios, said system comprising:
    a multichannel broadband re-configurable RF front end for operating a plurality of transceiver channels of said software defined radios and cognitive radios on a broad frequency range, wherein each transceiver channel comprises,
        an RF transmitter for upconverting a baseband signal to an RF signal;
        an RF receiver for downconverting said RF signal from an antenna in to said baseband signal using at least one of double and dual conversion;
        a control and monitoring section with a controller for at least one of receiving and sending signals for re-configuring a channel;
        a reference switching section for providing a reference frequency to frequency synthesizers in channels;
        a Transmit/Receiver switch to operate a channel in at least one of a Time Division Duplex (TDD) and a Frequency Division Duplex (FDD) mode of operation; and
        a power supply and conditioning circuit.

2. The system as claimed in claim 1, wherein each transceiver channel is capable of performing at least one of a transmitter function and a receiver function.

3. The system as claimed in claim 1, wherein one receiver of one transceiver channel is dedicated for sensing of spectrum holes if used for cognitive radio application.

4. The system as claimed in claim 1, wherein the plurality of channels increase the reliability of the system.

5. The system as claimed in claim 1, wherein each transceiver channel can operate at a broad frequency range of 400 MHz till 6000 MHz.

6. The system as claimed in claim 1, wherein each transceiver channel has 80 dB of input power dynamic range for receiver and 80 dB of output power dynamic range for transmitter.

7. The system as claimed in claim 1, wherein each transceiver channel is reconfigurable across a range of operating parameters.

8. The system as claimed in claim 1, wherein each transceiver channel is reconfigurable across the frequency range from 400 MHz to 6000 MHz.

9. The system as claimed in claim 1, wherein each receiver in each transceiver channel is independently reconfigurable across input power dynamic range from −80 dBm to +0 dBm.

10. The system as claimed in claim 1, wherein each transmitter in each of said transceiver channels is independently reconfigurable the output power dynamic range from −70 dBm to +10 dBm.

11. A method for operating at least one of software defined radios and cognitive radios, said method comprising:
   operating a plurality of transceiver channels of said software defined radios and cognitive radios on a broad frequency range by a multichannel broadband re-configurable RF front end, wherein operating each of said plurality of transceiver channels comprises:
      upconverting a baseband signal to a RF signal, by an RF transmitter;
      downconverting said RF signal from an antenna in to said baseband signal using at least one of a double and a dual conversion, by an RE receiver;
      receiving signals for re-configuring a channel, by a control and monitoring section;
      sending signals for re-configuring a channel, by said control and monitoring section;
      providing a reference frequency to frequency synthesizers in said plurality of channels, by a reference switching section; and
      performing at least one of a Time Division Duplex (TDD) and a Frequency Division Duplex (FDD) mode of operation on each of said plurality of channels, by a Transmit/Receiver switch.

12. The method as claimed in claim 11, wherein each transceiver channel is capable of performing at least one of a transmitter function and a receiver function.

13. The method as claimed in claim 11, wherein one receiver of one transceiver channel is dedicated for sensing of spectrum holes if used for cognitive radio application.

14. The method as claimed in claim 11, wherein said plurality of channels increase reliability of the multichannel broadband re-configurable RF front end system.

15. The method as claimed in claim 11, wherein each transceiver channel can operate at a broad frequency range of 400 MHz till 6000 MHz.

16. The method as claimed in claim 11, wherein each transceiver channel has 80 dB of input power dynamic range for receiver and 80 dB of output power dynamic range for transmitter.

17. The method as claimed in claim 11, wherein each transceiver channel is reconfigurable across a range of operating parameters.

18. The method as claimed in claim 11, wherein each transceiver channel is reconfigurable across the frequency range from 400 MHz to 6000 MHz.

19. The method as claimed in claim 11, wherein each receiver in each transceiver channel is independently reconfigurable across input power dynamic range from −80 dBm to +0 dBm.

20. The method as claimed in claim 11, wherein each transmitter, in each transceiver channel is independently reconfigurable the output power dynamic range from −70 dBm to +10 dBm.

* * * * *